US012694834B2

(12) United States Patent
Huang et al.

(10) Patent No.: US 12,694,834 B2
(45) Date of Patent: Jul. 28, 2026

(54) DISPLAY DRIVER CIRCUIT, INTEGRATED CIRCUIT, OLED SCREEN, DEVICE, AND METHOD

(71) Applicant: HUAWEI TECHNOLOGIES CO., LTD., Shenzhen (CN)

(72) Inventors: Huaqiang Huang, Shenzhen (CN); Wei Hsiang Hung, Shenzhen (CN); Chuan Che Lee, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/001,146

(22) Filed: Dec. 24, 2024

(65) Prior Publication Data

US 2025/0131884 A1 Apr. 24, 2025

Related U.S. Application Data

(63) Continuation of application No. PCT/CN2023/099465, filed on Jun. 9, 2023.

(30) Foreign Application Priority Data

Jul. 4, 2022 (CN) ......................... 202210779780.9
Oct. 31, 2022 (CN) ......................... 202211350277.8

(51) Int. Cl.
*G09G 3/3233* (2016.01)

(52) U.S. Cl.
CPC ... *G09G 3/3233* (2013.01); *G09G 2320/0247* (2013.01); *G09G 2330/021* (2013.01); *G09G 2370/047* (2013.01)

(58) Field of Classification Search
CPC ......... G09G 3/3233; G09G 2320/0247; G09G 2330/021; G09G 2370/047;
(Continued)

(56) References Cited

U.S. PATENT DOCUMENTS 11,527,209 B2 * 12/2022 Wang ................... G09G 3/3688
11,663,950 B2 * 5/2023 Park ..................... G09G 3/3275
345/690

(Continued)

FOREIGN PATENT DOCUMENTS

CN 108694900 A 10/2018
CN 109521591 A 3/2019

(Continued)

OTHER PUBLICATIONS

Tanaka et al., "Effect of Carrier Balance on Device Degradation of Organic Light-Emitting Diodes Based on Thermally Activated Delayed Fluorescence Emitters," Advanced Electronic Materials, Feb. 8, 2019, 8 pages.

(Continued)

*Primary Examiner* — Jeff Piziali
(74) *Attorney, Agent, or Firm* — Fish & Richardson P.C.

(57) ABSTRACT

Example displaying methods and apparatus are described. In one example method, a display driver circuit is configured to provide a data signal in a data refresh frame of an organic light-emitting display (OLED) screen, and provide a keep voltage in a keep frame. The display driver circuit includes a plurality of data channels, and the OLED screen includes a plurality of pixel circuits. The plurality of data channels provide data signals for the plurality of pixel circuits in a one-to-one correspondence manner. The display driver circuit further includes a voltage keep channel, and the voltage keep channel provides keep voltages for the plurality of pixel circuits.

12 Claims, 6 Drawing Sheets

(58) Field of Classification Search
CPC ... G09G 2300/0819; G09G 2300/0842; G09G 2300/0861; G09G 2310/0294; G09G 2310/0297; G09G 2340/0435; G09G 3/3275
See application file for complete search history.

(56) References Cited

U.S. PATENT DOCUMENTS

| | | | | |
|---|---|---|---|---|
| 11,783,779 | B2 * | 10/2023 | Lee | G09G 3/3233 345/691 |
| 11,972,735 | B2 * | 4/2024 | Kim | G09G 3/3233 |
| 12,094,424 | B2 * | 9/2024 | Kim | G09G 3/3291 |
| 12,254,841 | B2 * | 3/2025 | Zheng | G09G 3/3233 |
| 2020/0111418 | A1 | 4/2020 | Nam et al. | |
| 2020/0118498 | A1 * | 4/2020 | Lee | G09G 5/39 |
| 2020/0294451 | A1 | 9/2020 | Kim et al. | |
| 2020/0394961 | A1 | 12/2020 | Kim et al. | |
| 2021/0201798 | A1 * | 7/2021 | Kim | G09G 3/3233 |
| 2021/0202661 | A1 * | 7/2021 | Kim | H10K 59/124 |
| 2022/0059036 | A1 | 2/2022 | Sang et al. | |
| 2022/0199005 | A1 | 6/2022 | Kim | |

FOREIGN PATENT DOCUMENTS

| | | | |
|---|---|---|---|
| CN | 113763888 | A | 12/2021 |
| CN | 114038429 | A | 2/2022 |
| WO | 2016065748 | A1 | 5/2016 |

OTHER PUBLICATIONS

International Search Report and Written Opinion in International Appln. No. PCT/CN2023/099465, mailed on Sep. 8, 2023, 20 pages (with English Translation).
Extended European Search Report in European Appln. No. 23834592.0-1207, mailed on Jul. 14, 2025, 14 pages.

* cited by examiner

DISPLAY DRIVER CIRCUIT, INTEGRATED CIRCUIT, OLED SCREEN, DEVICE, AND METHOD

CROSS-REFERENCE TO RELATED APPLICATIONS

This application is a continuation of International Application No. PCT/CN2023/099465, filed on Jun. 9, 2023, which claims priority to Chinese Patent Application No. 202210779780.9, filed on Jul. 4, 2022, and Chinese Patent Application No. 202211350277.8, filed on Oct. 31, 2022. All of the aforementioned patent applications are hereby incorporated by reference in their entireties.

TECHNICAL FIELD

This application relates to the field of electronic technologies, and in particular, to a display driver circuit, an integrated circuit, an OLED screen, a device, and a method.

BACKGROUND

Organic light-emitting display (OLED) screens are widely used in various terminal devices having a display function, such as a mobile phone, a computer, and a television. Currently, a 7T1C pixel circuit is usually used in the OLED screen. To be specific, the pixel circuit includes seven transistors (T) and one capacitor (C). The seven transistors include one data thin film transistor (DTFT).

In the conventional technology, after the pixel circuit operates for a period of time, a drive current of the pixel circuit gradually decreases, and consequently, operating performance of the pixel circuit is reduced. Therefore, how to improve stability of the drive current of the pixel circuit is an urgent problem to be resolved.

SUMMARY

This application provides a display driver circuit, an integrated circuit, an OLED screen, a device, and a method, to improve stability of a drive current of a pixel circuit.

To achieve the foregoing objective, this application uses the following technical solutions.

According to a first aspect, a display driver circuit is provided, configured to drive an OLED screen. The OLED screen is configured to operate in a plurality of screen refreshing frequency periods, each refresh frequency period includes one data refresh frame and a plurality of keep frames, and the plurality of keep frames are configured following the data refresh frame. The display driver circuit is configured to provide a data signal in the data refresh frame and provide a keep voltage in the keep frame. The display driver circuit includes a plurality of data channels, and the OLED screen includes a plurality of pixel circuits. The plurality of data channels are configured to provide data signals for the plurality of pixel circuits in a one-to-one correspondence manner, and the data signal may be used to refresh data of a corresponding pixel circuit. The display driver circuit further includes a voltage keep channel. The voltage keep channel is configured to provide keep voltages for the plurality of pixel circuits. The keep voltage may be used to excite the pixel circuit, for example, excite a carrier in a DTFT in the pixel circuit, to increase a drive current. The display driver circuit further includes a plurality of screen drive switches that are disposed in a one-to-one correspondence with the plurality of pixel circuits, and each screen drive switch is configured to select and provide a data signal and a keep voltage for a corresponding pixel circuit.

In the foregoing technical solution, the display driver circuit may provide the data signals for the plurality of pixel circuits of the OLED screen in a one-to-one correspondence manner via the plurality of data channels, to refresh the plurality of pixel circuits, and provide the keep voltages for the plurality of pixel circuits via the voltage keep channel, to excite the plurality of pixel circuits. In this way, drive currents of the plurality of pixel circuits do not decrease with time, and the plurality of pixel circuits can share the voltage keep channel without changing a structure of the pixel circuit of the OLED screen, so that the plurality of pixel circuits of the OLED screen are excited with low power consumption, thereby improving stability of the drive currents of the plurality of pixel circuits.

In a possible implementation of the first aspect, the voltage keep channel includes a low dropout regulator LDO, and the LDO is configured to provide a keep voltage for each of the plurality of pixel circuits. In the foregoing possible implementation, the LDO is newly added to the display driver circuit, and is configured to provide, for the plurality of pixel circuits of the OLED screen, corresponding keep voltages used to excite the pixel circuits, so that the plurality of pixel circuits of the OLED screen are excited with low power consumption without changing the structure of the pixel circuit of the OLED screen, to improve stability of the drive currents of the plurality of pixel circuits.

In a possible implementation of the first aspect, the voltage keep channel includes a dedicated driver circuit, and the dedicated driver circuit is configured to provide a keep voltage for each of the plurality of pixel circuits. In the foregoing possible implementation, the dedicated driver circuit is newly added to the display driver circuit, and is configured to provide, for the plurality of pixel circuits of the OLED screen, corresponding keep voltages used to excite the pixel circuits, so that the plurality of pixel circuits of the OLED screen are excited with low power consumption without changing the structure of the pixel circuit of the OLED screen, to improve stability of the drive currents of the plurality of pixel circuits.

In a possible implementation of the first aspect, each of the plurality of data channels includes one driver circuit, the voltage keep channel reuses a driver circuit in a part of data channels, and the reused driver circuit is configured to provide a keep voltage for each of the plurality of pixel circuits. In the foregoing possible implementation, the driver circuit of the part of data channels in the display driver circuit is reused, to provide, for the plurality of pixel circuits of the OLED screen, corresponding keep voltages used to excite the pixel circuits, so that costs of the display driver circuit can be reduced. In addition, the plurality of pixel circuits of the OLED screen are excited with low power consumption without changing the structure of the pixel circuit of the OLED screen, to improve stability of the drive currents of the plurality of pixel circuits.

In a possible implementation of the first aspect, the plurality of pixel circuits include 1280 pixel circuits or 2560 pixel circuits.

In a possible implementation of the first aspect, the OLED display is a low-temperature polycrystalline oxide LTPO display. In the foregoing possible implementation, a display that supports an extremely low frame rate is provided. When the display driver circuit is used to drive the LTPO display, a problem that the LTPO display flickers at a low frame rate can be avoided.

According to a second aspect, an OLED screen is provided. The OLED screen is configured to operate in a plurality of screen refreshing frequency periods, each refresh frequency period includes one data refresh frame and a plurality of keep frames, and the plurality of keep frames are configured following the data refresh frame. The OLED screen is configured to: receive, in the data refresh frame, a data signal provided by a display driver circuit; and receive, in the keep frame, a keep voltage provided by the display driver circuit. The OLED screen includes a plurality of pixel circuits. The plurality of pixel circuits are respectively configured to receive data signals provided by a plurality of data channels of the display driver circuit in a one-to-one correspondence manner. The plurality of pixel circuits are further configured to receive keep voltages provided by a voltage keep channel of the display driver circuit. A data signal and a keep voltage that are received by each pixel circuit are selected by a screen drive switch that is in the display driver circuit and that corresponds to the pixel circuit.

In a possible implementation of the second aspect, the pixel circuit includes a first transistor, a second transistor, a third transistor, a fourth transistor, a fifth transistor, a sixth transistor, a data thin film transistor, a capacitor, and a light-emitting diode. One electrode of the first transistor is coupled to a first node, and the capacitor is coupled between the first node and a power supply end. One electrode of the fourth transistor is coupled to a second node, and the other electrode of the fourth transistor is configured to receive the data signal and the keep voltage. The fifth transistor is coupled between the power supply end and the second node, and the third transistor is coupled between the first node and a third node. The data thin film transistor is coupled between the second node and the third node, and a control end of the data thin film transistor is coupled to the first node. One electrode of the second transistor, one electrode of the sixth transistor, and one electrode of the light-emitting diode are coupled, the other electrode of the sixth transistor is coupled to the third node.

According to a third aspect, a control method for a display driver circuit is provided. The display driver circuit is configured to drive an OLED screen. The OLED screen is configured to operate in a plurality of screen refreshing frequency periods, each refresh frequency period includes one data refresh frame and a plurality of keep frames, and the plurality of keep frames are configured following the data refresh frame. The display driver circuit is configured to provide a data signal in the data refresh frame and provide a keep voltage in the keep frame. The display driver circuit includes a plurality of data channels, a voltage keep channel, and a plurality of screen drive switches. The display OLED screen includes a plurality of pixel circuits, and the plurality of screen drive switches are disposed in a one-to-one correspondence with the plurality of pixel circuits. The method includes: The plurality of data channels provide data signals for the plurality of pixel circuits in a one-to-one correspondence manner; and the voltage keep channel provides keep voltages for the plurality of pixel circuits. Each of the plurality of screen drive switches selects and provides the data signal and the keep voltage for a corresponding pixel circuit.

In a possible implementation of the third aspect, the voltage keep channel includes a low dropout regulator LDO, and that the voltage keep channel provides keep voltages for the plurality of pixel circuits includes: The LDO provides one keep voltage for each of the plurality of pixel circuits.

In a possible implementation of the third aspect, the voltage keep channel includes a dedicated driver circuit, and that the voltage keep channel provides keep voltages for the plurality of pixel circuits includes: The dedicated driver circuit provides one keep voltage for each of the plurality of pixel circuits.

In a possible implementation of the third aspect, each of the plurality of data channels includes one driver circuit, the voltage keep channel reuses a driver circuit in a part of data channels, and that the voltage keep channel provides keep voltages for the plurality of pixel circuits includes: The reused driver circuit provides one keep voltage for each of the plurality of pixel circuits.

In a possible implementation of the third aspect, the plurality of pixel circuits include 1280 pixel circuits or 2560 pixel circuits.

In a possible implementation of the third aspect, the OLED display is a low-temperature polycrystalline oxide LTPO display.

According to another aspect of this application, a display driver integrated circuit is provided. The display driver integrated circuit includes the display driver circuit provided in any one of the first aspect or the possible implementations of the first aspect.

According to still another aspect of this application, a display device is provided. The display device includes an OLED screen and the display driver circuit provided in any one of the first aspect or the possible implementations of the first aspect. The display driver circuit is configured to drive the OLED screen.

It may be understood that, for beneficial effect that can be achieved by any one of the OLED screen, the control method for the display driver circuit, the display driver integrated circuit, and the display device provided above, refer to the beneficial effect in the display driver circuit provided above. Details are not described herein again.

DESCRIPTION OF EMBODIMENTS

The following describes technical solutions in embodiments of this application with reference to accompanying drawings in embodiments of this application. In this application, "at least one" refers to one or more, and "a plurality of" refers to two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In embodiments of this application, words such as "first" and "second" are used to distinguish between objects with similar names, functions, or effects. A person skilled in the art may understand that the words such as "first" and "second" do not limit a quantity or an execution sequence. The term "coupling" is used for representing an electrical connection, including a direct connection through a wire or a connection end or an indirect connection through another device. Therefore, "coupling" should be considered as a generalized electronic communication connection.

It should be noted that, in this application, the terms such as "example" or "for example" are used to represent giving an example, an illustration, or a description. Any embodiment or design scheme described as an "example" or "for example" in this application should not be explained as being more preferred or having more advantages than another embodiment or design scheme. To be precise, use of the word such as "example" or "for example" is intended to present a relative concept in a specific manner.

The technical solutions of this application may be applied to various display devices that support an organic light-emitting display (OLED) screen. The display device may include but is not limited to a mobile phone, a tablet computer, a notebook computer, a computer, an ultra-mobile personal computer (UMPC), a netbook, a video camera, a camera, a vehicle-mounted device (for example, a car, a bicycle, an electric vehicle, an airplane, a ship, a train, or a high-speed railway), a virtual reality (VR) device, an augmented reality (AR) device, and the like.

Figure 1:
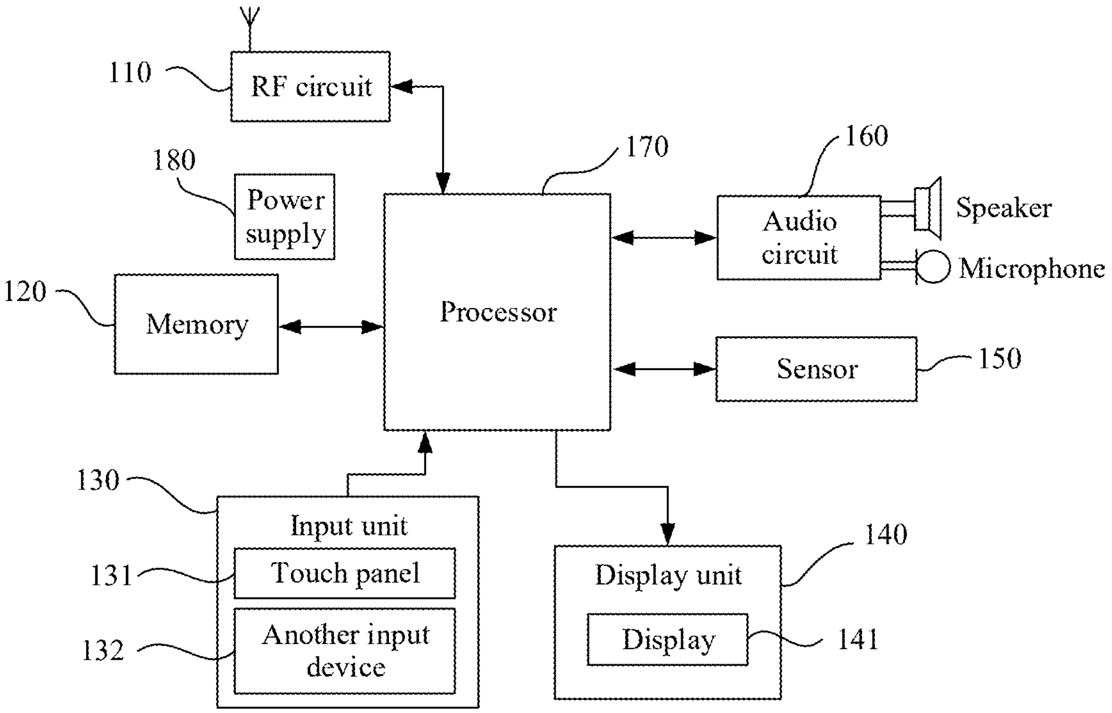
FIG. 1 is a diagram of a structure of a display device according to an embodiment of this application.

FIG. 1 is a diagram of a structure of a display device according to an embodiment of this application. The display device is described by using a mobile phone as an example. The display device may include components such as a radio frequency (RF) circuit 110, a memory 120, an input unit 130, a display unit 140, a sensor 150, an audio circuit 160, a processor 170, and a power supply 180. The following describes each component of the display device in detail with reference to FIG. 1.

The RF circuit 110 may be configured to receive/send information, or receive or send a signal during a call. Particularly, after receiving downlink information from a base station, the RF circuit 110 sends the downlink information to the processor 170 for processing. In addition, the RF circuit 110 sends uplink data to the base station. The RF circuit 110 usually includes but is not limited to an antenna, at least one amplifier, a transceiver, a coupler, a low noise amplifier (LNA), a duplexer, and the like. In addition, the RF circuit 110 may further communicate with a network and another device through wireless communication.

The memory 120 may be configured to store data, a software program, and a module, and mainly includes a program storage area and a data storage area. The program storage area may store an operating system and an application program required by at least one function, such as a sound play function and an image play function. The data storage area may store data created based on use of the display device, for example, audio data, image data, or a phone book. In addition, the display device may include a high-speed random access memory, and may further include a non-volatile memory, for example, at least one magnetic disk storage device, a flash storage device, or another volatile solid-state storage device.

The input unit 130 may be configured to receive entered digital or character information, and generate a key signal input related to a user setting and function control of the display device. Specifically, the input unit 130 may include a touch panel 131 and another input device 132. The touch panel 131 may also be referred to as a touchscreen, and may collect a touch operation performed by a user on or near the touch panel (for example, an operation performed by the user on the touch panel or near the touch panel by using any proper object or accessory, such as a finger or a stylus), and drive a corresponding connection apparatus according to a preset program. Optionally, the another input device 132 may include but is not limited to one or more of a physical keyboard, a function button (like a volume control button or a power on/off button), a trackball, a mouse, a joystick, and the like.

The display unit 140 may be configured to display information entered by the user or information provided for the user, various menus of the display device, and the like. Optionally, the display unit 140 may include a display 141, and the display 141 may be configured to display the foregoing information. Further, the touch panel 131 may cover the display 141. After detecting a touch operation on or near the touch panel 131, the touch panel 131 transfers the touch operation to the processor 170 to determine a type of a touch event. Then, the processor 170 provides corresponding visual output on the display 141 based on the type of the touch event. Although the touch panel 131 and the display 141 are used as two independent parts in FIG. 1 to implement input and output functions of the display device, in some embodiments, the touch panel 131 and the display 141 may be integrated to implement the input and output functions of the wearable device.

The sensor 150 may include one or more sensors, and is configured to provide status evaluation in various aspects for the display device. The sensor 150 may include an optical sensor, and the optical sensor may be used in an imaging application, to be specific, become a component of a camera or a camera lens. In addition, the sensor 150 may further include an acceleration sensor, a gyroscope sensor, a magnetic sensor, a pressure sensor, or a temperature sensor. The sensor 150 may detect acceleration/deceleration, an orientation, an on/off state, and relative positioning of components of the display device, a temperature change of the display device, or the like.

The audio circuit 160, a speaker, and a microphone may provide an audio interface between the user and the display device. The audio circuit 160 may convert received audio data into an electrical signal, and transmit the electrical signal to the speaker. The speaker converts the electrical signal into a sound signal and outputs the sound signal. In addition, the microphone converts the collected sound signal into an electrical signal. The audio circuit 160 receives the electrical signal, converts the electrical signal into audio data, and then outputs the audio data to the RF circuit 110, so that the RF circuit 110 sends the audio data to, for example, another mobile phone, or outputs the audio data to the memory 120 for further processing.

The processor 170 is a control center of the display device, is connected to all parts of the entire display device through various interfaces and lines, and performs various functions of the display device and data processing by running or executing the software program and/or the module stored in the memory 120 and invoking the data stored in the memory 120, to perform overall monitoring on the display device. Optionally, the processor 170 may include one or more processing units. The processing unit may include but is not limited to a central processing unit, a general-purpose processor, a digital signal processor, a neural network processor, an image processing unit, an image signal processor, a microcontroller, a microprocessor, or the like. Further, the processor 170 may further include another hardware circuit or accelerator, for example, an application-specific integrated circuit, a field programmable gate array or another programmable logic device, a transistor logic device, a hardware component, or any combination thereof. Optionally, the processor 170 may alternatively be a combination of processors implementing a computing function, for example, a combination of one or more microprocessors, or a combination of a digital signal processor and a microprocessor.

The display device may further include the power supply 180 (for example, a battery) that supplies power to each component. The power supply 180 may be logically connected to the processor 170 via a power management system, to implement functions such as charging management, discharging management, and power consumption management via the power management system.

Although not shown, the display device may further include a wireless fidelity (Wi-Fi) module, a Bluetooth module, and the like. Details are not described herein again in this embodiment of this application. A person skilled in the art may understand that the structure of the display device shown in FIG. 1 does not constitute a limitation on the display device, and the display device may include more or fewer components than those shown in the figure, or combine some components, or have different component arrangements.

Figure 2:
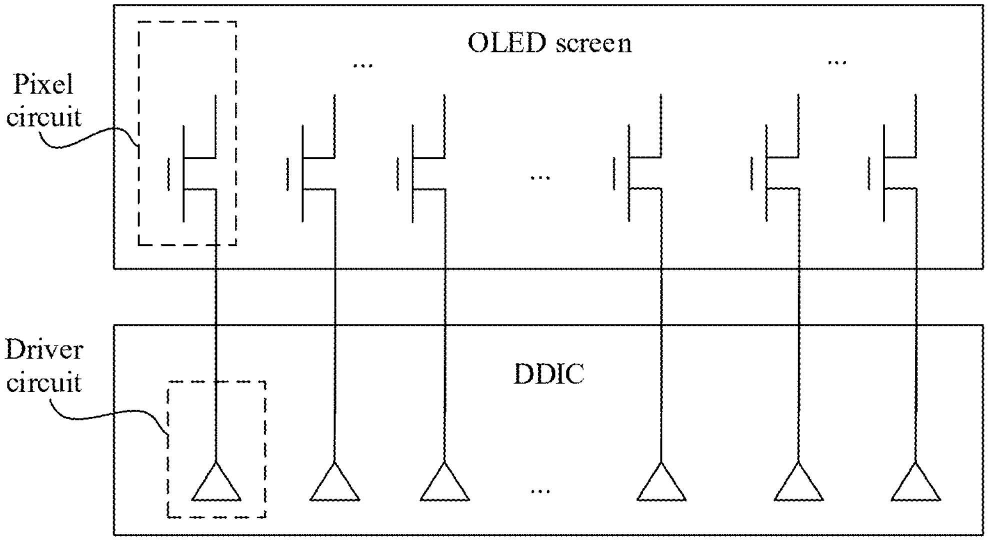
FIG. 2 is a diagram of a structure of a display unit according to an embodiment of this application.

In this embodiment of this application, the display 141 in the display unit 140 may be an organic light-emitting display (OLED) screen. Optionally, the OLED screen includes but is not limited to a low-temperature polycrystalline oxide (LTPO) display and a low-temperature poly-silicon (LTPS) display. In actual application, the display unit 140 may further include a display driver integrated circuit (DDIC) configured to drive the OLED screen. For example, as shown in FIG. 2, the OLED screen may include a plurality of pixel circuits, and the DDIC may include a plurality of driver circuits. The plurality of driver circuits are coupled to the plurality of pixel circuits in a one-to-one correspondence, and a pixel circuit corresponding to one driver circuit may be configured to drive a correspondingly coupled pixel circuit, in other words, the driver circuit is configured to provide a drive signal DA for the pixel circuit.

Figure 3:
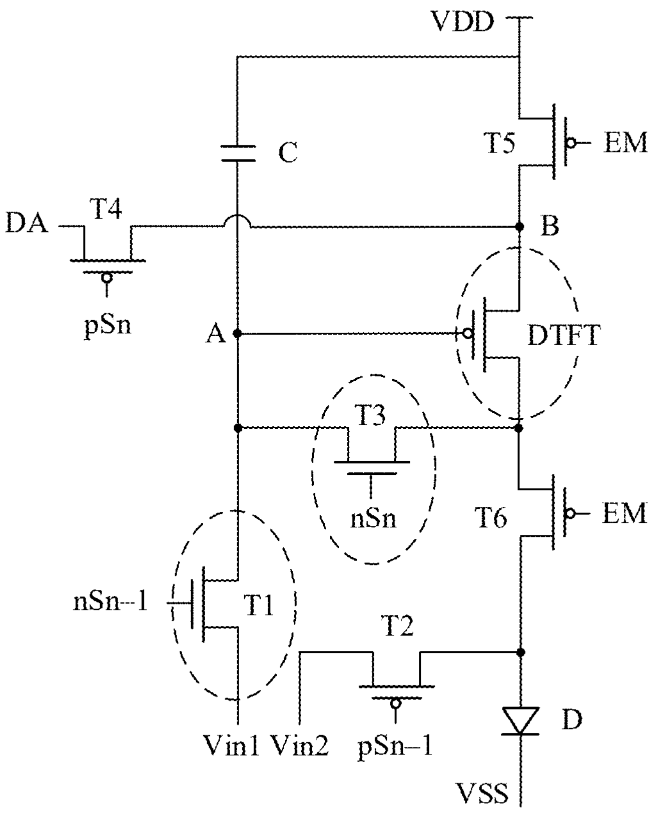
FIG. 3 is a diagram of a structure of a pixel unit according to an embodiment of this application.

Further, the pixel circuit may be implemented by using a 7T1C structure. For example, as shown in FIG. 3, the 7T1C pixel circuit includes transistors T1 to T6, a data thin film transistor DTFT, a capacitor C, and a light-emitting diode D. A drain (drain) of the transistor T4, a drain of the transistor T5, and a source (source) of the data thin film transistor DTFT are coupled to a node B. One end of the capacitor C and a source of the transistor T5 are coupled to a first power supply end VDD. The other end of the capacitor C, a gate (gate) of the data thin film transistor DTFT, a drain of the transistor T3, and a drain of the transistor T1 are coupled to the node A. A drain of the data thin film transistor DTFT, a source of the transistor T3, a source of the transistor T2, and one end of the light-emitting diode D are coupled. The other end of the light-emitting diode D is coupled to a second power supply end VSS. A source of the transistor T4 is configured to receive the drive signal DA, and a gate of the transistor T4 is configured to receive a control signal pSn. A source of the transistor T1 is configured to receive a first voltage Vin1, and a gate of the transistor T1 is configured to receive a reset control signal nSn−1. A drain of the transistor T2 is configured to receive a second voltage Vin2, and a gate of the transistor T2 is configured to receive a control signal pSn−1. A gate of the transistor T3 is configured to receive a control signal nSn, and a gate of the transistor T5 and a gate of the transistor T6 are configured to receive a light-emitting control signal EM.

Specifically, in an initialization phase, the transistor T1 is turned on, to initialize a voltage of the node A. In a charging phase, the transistors T3 and T4 are turned on, the data thin film transistor DTFT is turned on, the transistor T3 and the data thin film transistor DTFT are charged via the source of the transistor T4, and then the transistor T2 is turned on, to clear a voltage in the light-emitting diode D. In a refresh phase of the pixel circuit, the transistors T5 and T6 are turned on, and the light-emitting diode D is driven via the data thin film transistor DTFT to emit light for display. In a first sub-phase of a keep phase of the pixel circuit, the transistor T4 is turned on, and a voltage is provided for the node B via the source of the transistor T4. In a second sub-phase of the keep phase of the pixel circuit, the transistors T5 and T6 are turned on, and the data thin film transistor DTFT is discharged to keep the light-emitting diode D emitting light. The refresh phase may also be referred to as a data refresh frame, and the keep phase may also be referred to as a keep frame or a stop frame.

Figure 4:
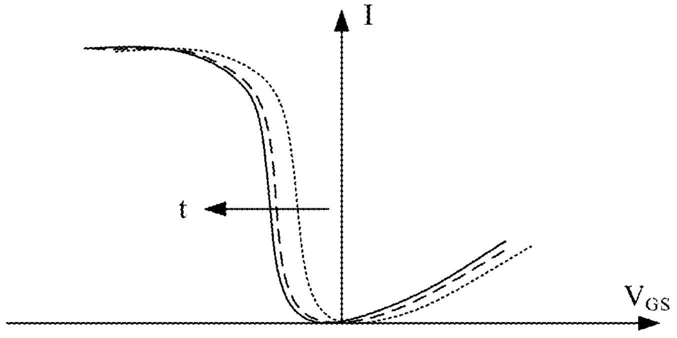
FIG. 4 is a diagram of a transfer characteristic curve of a DTFT according to an embodiment of this application.

It can be learned from the foregoing content that, when the pixel circuit is in the refresh phase and the keep phase, the DTFT in the pixel circuit is always in a turned-on state. Therefore, a carrier in the DTFT is captured by an interface defect, and a quantity of carriers participating in conduction decreases. As a result, a drive current of the DTFT gradually decreases, and a transfer characteristic curve shows a negative drift of the threshold voltage. FIG. 4 is a diagram in which the transfer characteristic curve of the DTFT changes with time t. A horizontal coordinate indicates a gate-source voltage $V_{GS}$ of the DTFT, and a vertical coordinate indicates a current I flowing through the DTFT. In addition, a decrease in the drive current further causes a decrease in brightness of the light-emitting diode D. Especially for a display (for example, the LTPO display) that supports an extremely low frame rate, the brightness of the light-emitting diode D is reduced and the light-emitting diode D is found by human eyes when the pixel circuit is in the keep phase for a long time, resulting in flicker at a low frame rate.

For the foregoing technical problem, in a related technology, the following two solutions are usually used to excite a carrier that is captured by an interface defect and that is in the DTFT, to restore the drive current of the DTFT. The following describes the two solutions.

In a first solution, the carrier in the DTFT is excited through time-based reusing of the transistor T4 in the pixel circuit. Specifically, in the refresh phase of the pixel circuit, the source of the transistor T4 is configured to receive a data voltage provided by a driver circuit that corresponds to the pixel circuit and that is in the DDIC. The data voltage is used to refresh the pixel circuit. In the refresh phase of the pixel circuit, the source of the transistor T4 is configured to receive an excitation voltage provided by a driver circuit corresponding to the pixel circuit. The excitation voltage is used to excite the carrier in the DTFT in the pixel circuit. However, for the plurality of pixel circuits of the OLED screen, in this solution, the plurality of corresponding driver circuits in the DDIC need to be in an operating state in both the refresh phase and the keep phase, and the plurality of driver circuits originally do not operate in the keep phase (in other words, the plurality of driver circuits may be in a disabled state). As a result, power consumption of the DDIC is greatly increased.

Figure 5:
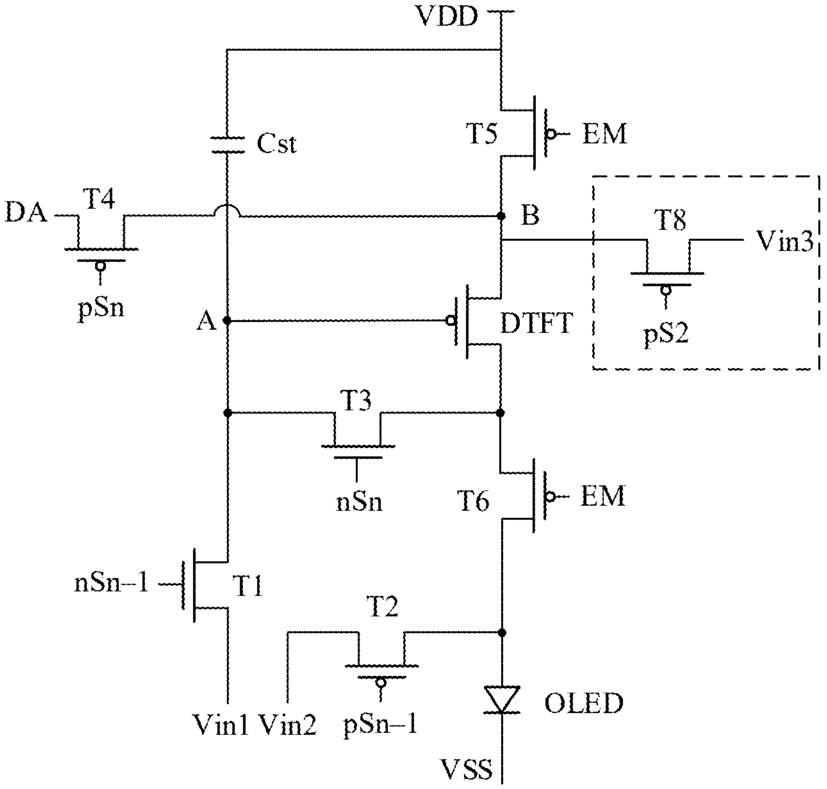
FIG. 5 is a diagram of a structure of another pixel unit according to an embodiment of this application.

In a second solution, a transistor T8 is added to excite the carrier in the DTFT. Specifically, with reference to FIG. 3, as shown in FIG. 5, the pixel circuit further includes the transistor T8. A source of the transistor T8 is coupled to the node B, a gate of the transistor T8 is configured to receive a control signal pS2, and a drain of the transistor T8 is configured to receive a third input voltage Vin3. In the refresh phase of the pixel circuit, the transistor T8 is turned off, and the source of the transistor T4 is configured to receive the data voltage provided by the driver circuit that corresponds to the pixel circuit and that is in the DDIC. The data voltage is used to refresh the pixel circuit. In the refresh phase of the pixel circuit, the transistor T4 is turned off, the source of the transistor T8 is configured to receive an excitation voltage, and the excitation voltage is used to excite the carrier in the DTFT in the pixel circuit. However, in this solution, the transistor T8 needs to be added to each pixel circuit of the OLED screen. Consequently, an existing product needs to be upgraded, and high costs are caused.

In view of this, embodiments of this application provide a display driver circuit without changing a structure of the pixel circuit of the OLED screen. The display driver circuit may provide the data voltage in the refresh phase of the OLED screen, and provide the excitation voltage in the keep phase of the OLED screen. In addition, in comparison with the foregoing two solutions, in this solution, carriers in the DTFTs in the plurality of pixel circuits of the OLED screen can be excited with low power consumption without increasing costs of the OLED screen.

Figure 6:
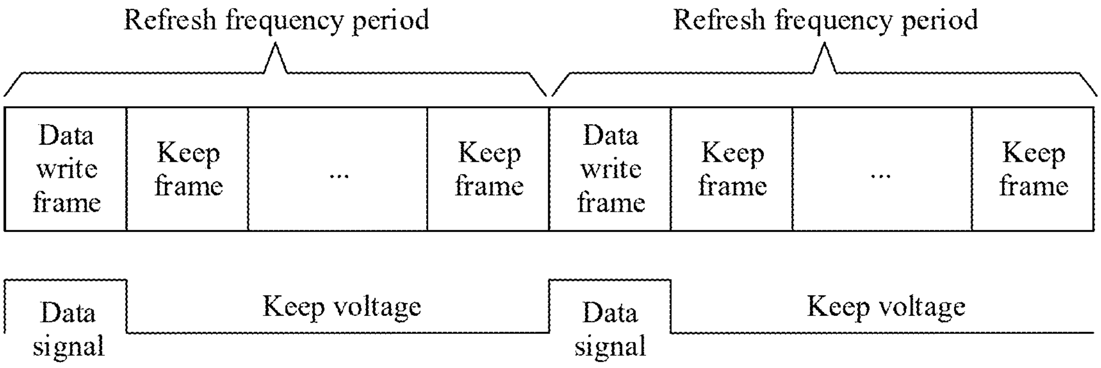
FIG. 6 is a diagram of a refresh frequency period according to an embodiment of this application.

An embodiment of this application provides a display driver circuit. The display driver circuit may be configured to drive an OLED screen, and the OLED screen may be an LTPO display or an LTPS display. As shown in FIG. 6, the OLED screen is configured to operate in a plurality of screen refreshing frequency periods. Each refresh frequency period includes one data refresh frame and a plurality of keep frames, and the plurality of keep frames are configured following the data refresh frame. The display driver circuit is configured to provide a data signal in the data refresh frame and provide a keep voltage in the keep frame. The display driver circuit includes a plurality of data channels, and the OLED screen includes a plurality of pixel circuits. For example, the plurality of pixel circuits may include 1280 pixel circuits or 2560 pixel circuits. The plurality of data channels are configured to provide data signals for the plurality of pixel circuits in a one-to-one correspondence manner. The display driver circuit further includes a voltage keep channel, and the voltage keep channel is configured to provide keep voltages for the plurality of pixel circuits. The display driver circuit further includes a plurality of screen drive switches that are disposed in a one-to-one correspondence with the plurality of pixel circuits, and each screen drive switch is configured to select and provide a data signal and a keep voltage for a corresponding pixel circuit. Optionally, each data channel may include one driver circuit.

Figure 7:
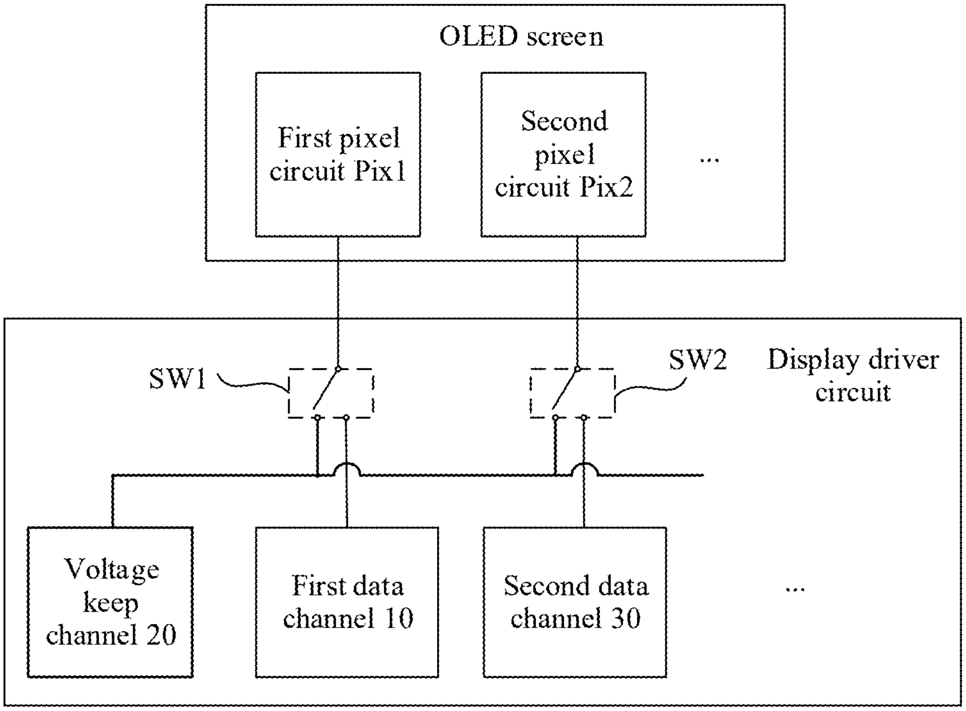
FIG. 7 is a diagram of a structure of a display driver circuit according to an embodiment of this application.

The following describes a structure of the display driver circuit with reference to FIG. 7. As shown in FIG. 7, the display driver circuit includes a first data channel 10 and a voltage keep channel 20. Both an output end of the first data channel 10 and an output end of the voltage keep channel 20 are configured to be coupled to a first pixel circuit Pix1 of the OLED screen.

The first data channel 10 is configured to provide a first data signal for the first pixel circuit Pix1, and the first data signal is used to refresh the first pixel circuit Pix1. For example, the first data channel 10 outputs the first data signal in a data refresh frame of the first pixel circuit Pix1, and the first data signal may be a first data voltage. The first data channel 10 is a data channel that is in the display driver circuit and that corresponds to the first pixel circuit Pix1.

The voltage keep channel 20 is configured to provide a first keep voltage for the first pixel circuit Pix1, and the first keep voltage is used to excite the first pixel circuit Pix1. For example, the voltage keep channel 20 outputs the first keep voltage in a keep frame of the first pixel circuit Pix1, and the first keep voltage may be used to excite a carrier that drives a thin film transistor DTFT in the first pixel circuit Pix1, to increase a drive current.

The first keep voltage may be a fixed voltage, that is, a voltage value of the first keep voltage may be fixed. A specific voltage value may be set based on an actual situation, provided that it is ensured that the first keep voltage can excite the carrier in the DTFT. A voltage value of the first keep voltage is not specifically limited in embodiments of this application.

Specifically, in the data refresh frame of the first pixel circuit Pix1, the voltage keep channel 20 may be in a closed state, the first data channel 10 is in an operating state and may be used to output the first data signal, and the first data signal may be used to refresh the first pixel circuit Pix1. In the keep frame of the first pixel circuit Pix1, the first data channel 10 may be in a closed state, the voltage keep channel 20 is in an operating state and may be configured to output the first keep voltage, and the first keep voltage may be used to excite a first DTFT in the first pixel circuit Pix1, to be specific, excite a carrier that is captured by an interface defect and that is in the first DTFT, to restore a drive current of the first DTFT.

Further, as shown in FIG. 7, the OLED screen may further include a second pixel circuit Pix2, and the output end of the voltage keep channel 20 is further configured to be coupled to the second pixel circuit Pix2. In other words, the output end of the voltage keep channel 20 may be coupled to both the first pixel circuit Pix1 and the second pixel circuit Pix2.

The voltage keep channel 20 is further configured to provide a second keep voltage for the second pixel circuit Pix2, and the second keep voltage is used to excite the second pixel circuit Pix2. For example, the voltage keep channel 20 outputs the second keep voltage in a keep frame of the second pixel circuit Pix2, to excite a second DTFT in the second pixel circuit Pix2 via the second keep voltage, that is, excite a carrier that is captured by the interface defect and that is in the second DTFT, to restore a drive current of the second DTFT. The second keep voltage may be a fixed voltage, and the second keep voltage may be equal to the first keep voltage.

Optionally, when the OLED screen further includes more other pixel circuits, the voltage keep channel 20 may be further configured to correspondingly output, in keep frames of the other pixel circuits, keep voltages used to excite DTFTs in the other pixel circuits. In other words, the display driver circuit may excite DTFTs in the plurality of pixel circuits of the OLED screen via one voltage keep channel 20, so that carriers in the DTFTs in the plurality of pixel circuits of the OLED screen can be excited with low power consumption without changing the structure of the pixel circuit of the OLED screen.

In addition, the display driver circuit may further include a second data channel 30 corresponding to the second pixel circuit Pix2. The second data channel 30 may be configured to provide a second data signal for the second pixel circuit Pix2, and the second data signal is used to refresh the second pixel circuit Pix2. For example, the second data channel 30 outputs the second data signal in a data refresh frame of the second pixel circuit Pix2. The second data signal may be a second data voltage.

In addition, the display driver circuit may further include a first screen drive switch SW1. A selection end of the first screen drive switch SW1 is configured to be coupled to the output end of the first data channel 10 or the output end of the voltage keep channel 20, and a fixed end of the first screen drive switch SW1 is configured to be coupled to the first pixel circuit Pix1. The first screen drive switch SW1 is configured to select the first data channel 10 or select the voltage keep channel 20. For example, the first screen drive switch SW1 is configured to: select the first data channel 10 in the data refresh frame of the first pixel circuit Pix1, so that the first data channel 10 outputs the first data signal to the first pixel circuit Pix1 in the data refresh frame of the first pixel circuit Pix1; and select the voltage keep channel 20 in the keep frame of the first pixel circuit Pix1, so that the voltage keep channel 20 outputs the keep voltage to the first pixel circuit Pix1 in the keep frame of the first pixel circuit Pix1.

Similarly, when the OLED screen further includes the second pixel circuit Pix2, the display driver circuit may further include a second screen drive switch SW2. A fixed end of the second screen drive switch SW2 may be configured to be coupled to the second pixel circuit Pix2, and a selection end of the second screen drive switch SW2 may be configured to be coupled to an output end of the second data channel 30 or the output end of the voltage keep channel 20. Further, when the OLED screen further includes more other pixel circuits, the display driver circuit may further include more other screen drive switches SWs. A fixed end of each screen drive switch SW may be configured to be coupled to a corresponding pixel circuit, and a selection end of each screen drive switch SW may be configured to be coupled to an output end of a corresponding driver circuit or the output end of the voltage keep channel 20.

Further, the voltage keep channel 20 may be implemented in a plurality of different manners. For example, the voltage keep channel 20 is additionally added to the display driver circuit, or a data channel that is in the display driver circuit and that corresponds to the pixel circuit is reused as the voltage keep channel 20.

In a first manner, the voltage keep channel 20 is additionally added to the display driver circuit.

Figure 8:
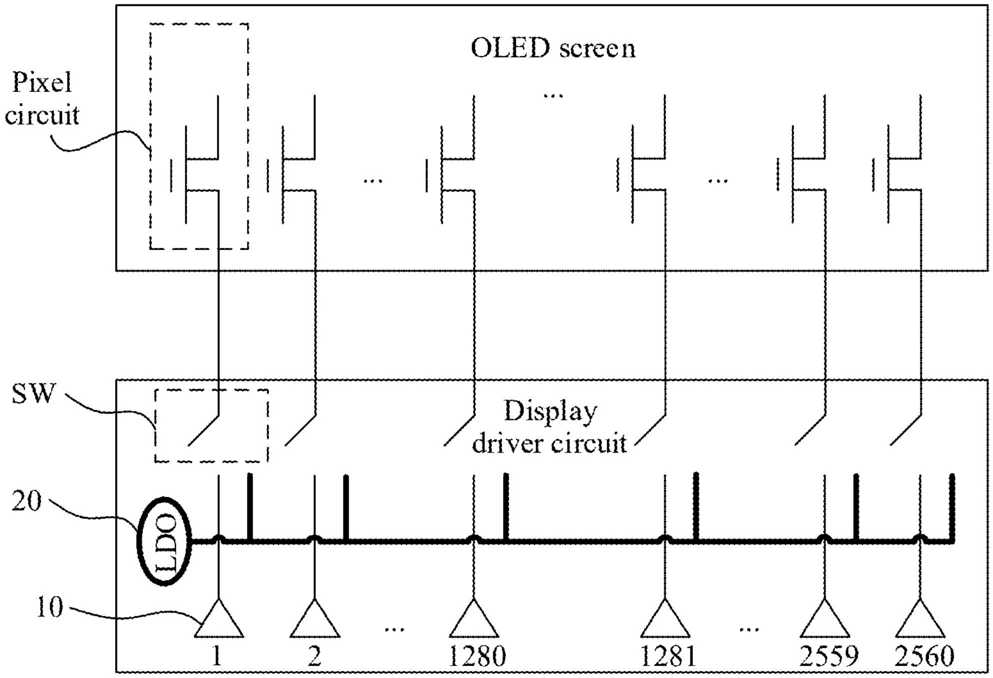
FIG. 8 is a diagram of a structure of another display driver circuit according to an embodiment of this application.
Figure 9:
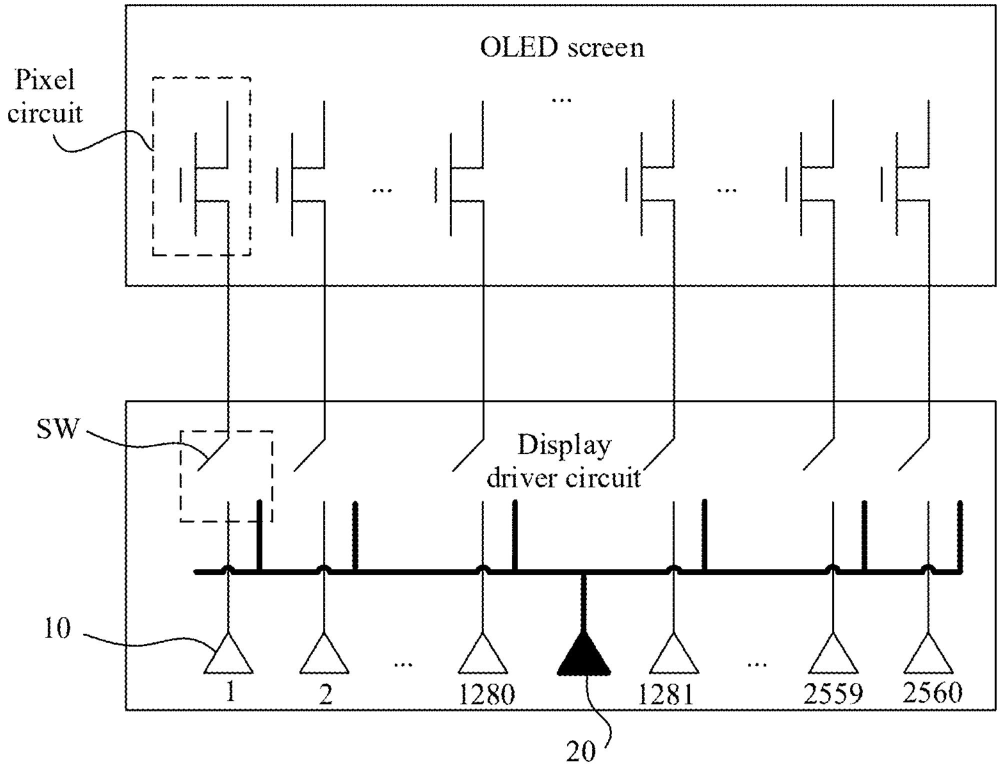
FIG. 9 is a diagram of a structure of still another display driver circuit according to an embodiment of this application.

In a possible embodiment, as shown in FIG. 8, the voltage keep channel 20 includes a low dropout regulator (LDO). The LDO may be configured to provide a keep voltage for each pixel circuit. In other words, the LDO may simultaneously excite the plurality of pixel circuits of the OLED screen. In another possible embodiment, as shown in FIG. 9, the voltage keep channel 20 includes a dedicated driver circuit. The dedicated driver circuit may be configured to provide a keep voltage for each pixel circuit. In other words, the voltage keep channel 20 may be a specially designed driver circuit configured to output the keep voltage. In FIG. 8 and FIG. 9, descriptions are provided by using an example in which the plurality of pixel circuits include 2560 pixel circuits (only one transistor is shown in the figure), and the display driver circuit includes 2560 data channels in a one-to-one correspondence with the plurality of pixel circuits, and one newly added voltage keep channel 20.

In a second manner, each of the plurality of data channels of the display driver circuit includes one driver circuit, and the voltage keep channel 20 reuses a driver circuit in a part of data channels.

Figure 10:
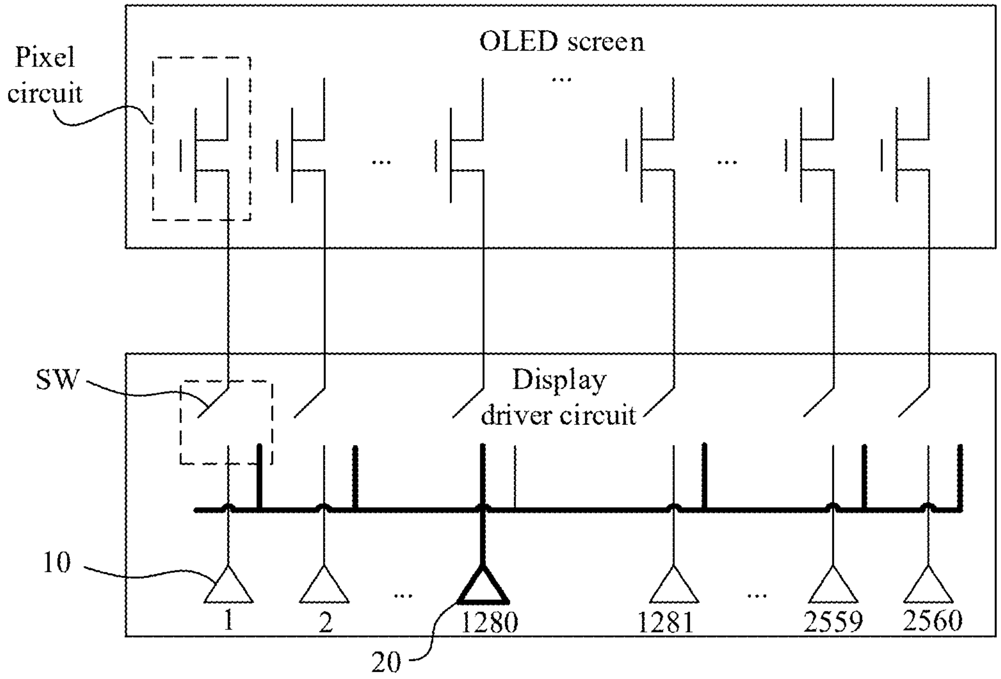
FIG. 10 is a diagram of a structure of yet another display driver circuit according to an embodiment of this application.
Figure 11:
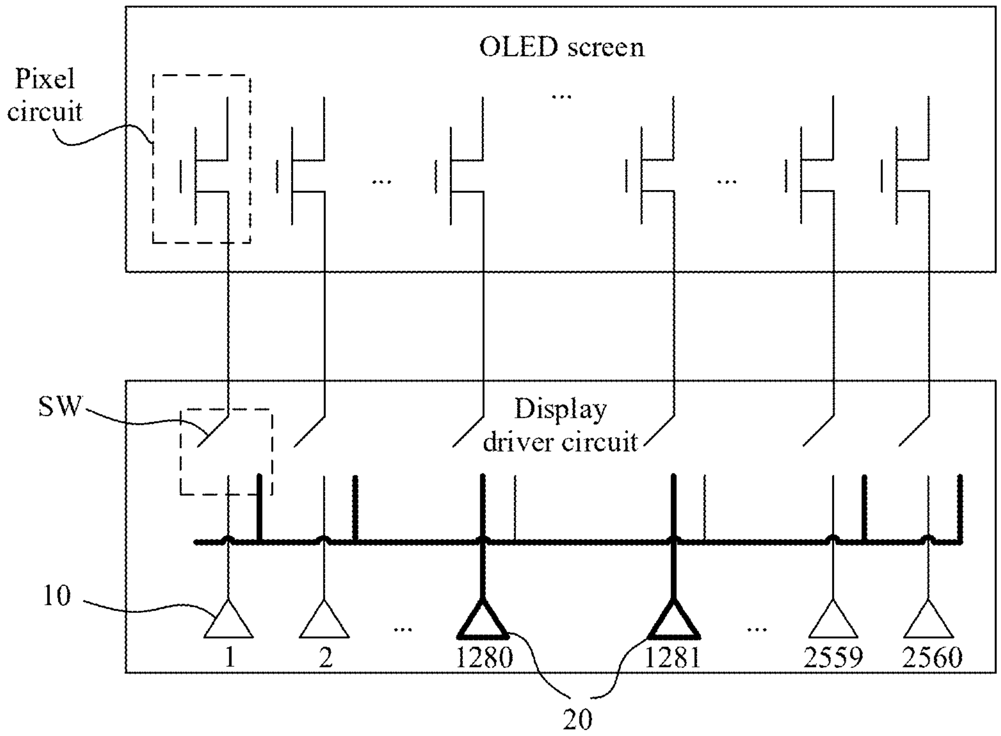
FIG. 11 is a diagram of a structure of still yet another display driver circuit according to an embodiment of this application.

In a possible embodiment, as shown in FIG. 10, the voltage keep channel 20 reuses a driver circuit in one data channel (that is, reuses one driver circuit). In this case, the driver circuit may include two output ends. One output end may be configured to be coupled to a corresponding pixel circuit, to output a data voltage to the pixel circuit. The other output end may be configured to be coupled to a plurality of pixel circuits of the OLED screen, to provide keep voltages for the plurality of pixel circuits. In a possible embodiment, as shown in FIG. 11, the voltage keep channel 20 reuses driver circuits in at least two data channels, that is, reuses at least two driver circuits. In this case, each of the at least two driver circuits may include two output ends. One output end may be configured to be coupled to a corresponding pixel circuit, to output a data voltage to the pixel circuit. The other output end may be configured to be coupled to a part of pixel circuits in the plurality of pixel circuits of the OLED screen, to provide keep voltages for the part of pixel circuits. In other words, the at least two driver circuits dispersedly provide keep voltages for different pixel circuits in the plurality of pixel circuits. In FIG. 10 and FIG. 11, descriptions are provided by using an example in which the plurality of pixel circuits include 2560 pixel circuits (only one transistor is shown in the figure), and the display driver circuit includes 2560 driver circuits that are in a one-to-one correspondence with the plurality of pixel circuits. In FIG. 10, an example in which the driver circuit reused by the voltage keep channel 20 is a $1280^{th}$ driver circuit is used for description. In FIG. 11, an example in which the driver circuits reused by the at least two voltage keep channels 20 include the $1280^{th}$ driver circuit and a $1281^{st}$ driver circuit is used for description.

For specific structures and operating principles of the LDO, the dedicated driver circuit, and the driver circuit corresponding to the pixel circuit, refer to descriptions in the conventional technology. Details are not described herein again in this embodiment of this application.

According to the display driver circuit provided in this embodiment of this application, the data signal can be provided in the data refresh frame of the OLED screen, and the keep voltage can be provided in the keep frame of the OLED screen without changing the structure of the pixel circuit of the OLED screen. In addition, in comparison with the two solutions in the foregoing related technology, in this solution, carriers in the DTFTs in the plurality of pixel circuits of the OLED screen can be excited with low power consumption without increasing costs of the OLED screen. In other words, in comparison with the two solutions in the foregoing related technology, in this solution, costs of the OLED screen and power consumption of the display driver circuit can be effectively reduced in the solution provided in this embodiment of this application.

In view of this, an embodiment of this application further provides an OLED screen. The OLED screen is configured to operate in a plurality of screen refreshing frequency periods, each refresh frequency period includes one data refresh frame and a plurality of keep frames, and the plurality of keep frames are configured following the data refresh frame. The OLED screen is configured to: receive, in the data refresh frame, a data signal provided by a display driver circuit; and receive, in the keep frame, a keep voltage provided by the display driver circuit. The OLED screen includes a plurality of pixel circuits. The plurality of pixel circuits are respectively configured to receive data signals provided by a plurality of data channels of the display driver circuit in a one-to-one correspondence manner. The plurality of pixel circuits are further configured to receive a keep voltage provided by a voltage keep channel of the display driver circuit. A data signal and a keep voltage that are received by each pixel circuit are selected by a screen drive switch that is in the display driver circuit and that corresponds to the pixel circuit.

In a possible embodiment, the pixel circuit includes a first transistor, a second transistor, a third transistor, a fourth transistor, a fifth transistor, a sixth transistor, a data thin film transistor, a capacitor, and a light-emitting diode. One electrode of the first transistor is coupled to a first node, and the capacitor is coupled between the first node and a power supply end. One electrode of the fourth transistor is coupled to a second node, and the fifth transistor is coupled between the power supply end and the second node. The third transistor is coupled between the first node and a third node, and the data thin film transistor is coupled between the second node and the third node. A control end of the data thin film transistor is coupled to the first node, one electrode of the second transistor, one electrode of the sixth transistor, and one electrode of the light-emitting diode are coupled, and the other electrode of the sixth transistor is coupled to the third node.

An embodiment of this application further provides a display driver integrated circuit. The display driver integrated circuit includes any display driver circuit provided in embodiments of this application. For example, the display driver circuit may be the display driver circuit provided in any one of FIG. 7 to FIG. 11. For related descriptions of the display driver circuit, refer to the foregoing descriptions. Details are not described herein again in this embodiment of this application.

An embodiment of this application further provides a control method for a display driver circuit. The display driver circuit is configured to drive an OLED screen, and is configured to drive the organic light-emitting display OLED screen. The OLED screen is configured to operate in a plurality of screen refreshing frequency periods, each refresh frequency period includes one data refresh frame and a plurality of keep frames, and the plurality of keep frames are configured following the data refresh frame. The display driver circuit is configured to provide a data signal in the data refresh frame and provide a keep voltage in the keep frame. The display driver circuit includes a plurality of data channels, a voltage keep channel, and a plurality of screen drive switches. The display OLED screen includes a plurality of pixel circuits, and the plurality of screen drive switches are disposed in a one-to-one correspondence with the plurality of pixel circuits. The method includes: The plurality of data channels provide data signals for the plurality of pixel circuits in a one-to-one correspondence manner; the voltage keep channel provides keep voltages for the plurality of pixel circuits; and each of the plurality of screen drive switches selects and provides the data signal and the keep voltage for a corresponding pixel circuit.

Optionally, the plurality of pixel circuits include 1280 pixel circuits or 2560 pixel circuits.

In a possible embodiment, the voltage keep channel includes a low dropout regulator LDO, and that the voltage keep channel provides keep voltages for the plurality of pixel circuits includes: The LDO provides one keep voltage for each of the plurality of pixel circuits.

In another possible embodiment, the voltage keep channel includes a dedicated driver circuit, and that the voltage keep channel provides keep voltages for the plurality of pixel circuits includes: The dedicated driver circuit provides one keep voltage for each of the plurality of pixel circuits.

In still another possible embodiment, each of the plurality of data channels includes one driver circuit, and the voltage keep channel reuses a driver circuit in a part of data channels. That the voltage keep channel provides keep voltages for the plurality of pixel circuits includes: The reused driver circuit provides one keep voltage for each of the plurality of pixel circuits.

Optionally, the OLED display is a low-temperature polycrystalline oxide LTPO display.

In this embodiment of this application, according to the control method, the display driver circuit can be controlled to provide a data voltage in the data refresh frame of the OLED screen and provide an excitation voltage in the keep frame of the OLED screen without changing a structure of the pixel circuit of the OLED screen. In addition, in comparison with the two solutions in the foregoing related technology, in this solution, carriers in DTFTs in the plurality of pixel circuits of the OLED screen can be excited with low power consumption without increasing costs of the OLED screen.

Figure 12:
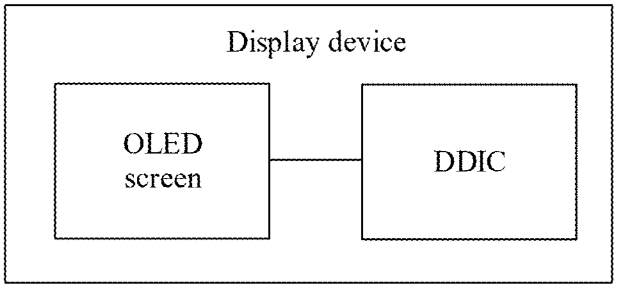
FIG. 12 is a diagram of a structure of another display device according to an embodiment of this application.

According to another aspect of this application, a display device is further provided. As shown in FIG. 12, the display device includes an OLED screen and a display driver integrated circuit DDIC coupled to the OLED screen. The DDIC includes a display driver circuit, the display driver circuit is configured to drive the OLED screen, and the display driver circuit may be any display driver circuit provided in embodiments of this application.

The foregoing detailed descriptions of the display driver circuit may be correspondingly cited in the display driver integrated circuit, the control method of the display driver circuit, and the display device. Details are not described herein again in this embodiment of this application. Each circuit, control method, and device provided in embodiments of this application include a function of the display driver circuit in the foregoing embodiments, and therefore can achieve same effect as the foregoing display driver circuit.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A display driver circuit, configured to drive an organic light-emitting display (OLED) screen, provide a data signal in a data refresh frame, and provide a keep voltage in a plurality of keep frames, wherein the OLED screen is configured to operate in a plurality of screen refreshing frequency periods, each refresh frequency period comprises the data refresh frame and the plurality of keep frames, the plurality of keep frames are configured after the data refresh frame; and wherein the display driver circuit comprises:

a plurality of data channels that are configured to provide data signals for a plurality of pixel circuits of the OLED screen in a one-to-one correspondence manner, each of the plurality of pixel circuits comprising a data thin film transistor;

a voltage keep channel that is configured to provide keep voltages for the plurality of pixel circuits; and a plurality of screen drive switches that are disposed in a one-to-one correspondence with the plurality of pixel circuits, and each of the plurality of screen drive switches is configured to select and provide a data signal and the keep voltage for a corresponding pixel circuit, wherein the keep voltage is configured to excite a carrier in each data thin film transistor to restore a respective drive current for driving the corresponding pixel circuit.

2. The display driver circuit according to claim 1, wherein the voltage keep channel comprises a low dropout regulator (LDO), and the LDO is configured to provide one keep voltage for each of the plurality of pixel circuits.

3. The display driver circuit according to claim 1, wherein the voltage keep channel comprises a dedicated driver circuit, and the dedicated driver circuit is configured to provide one keep voltage for each of the plurality of pixel circuits.

4. The display driver circuit according to claim 1, wherein each of the plurality of data channels comprises one driver circuit, the voltage keep channel is configured to reuse a driver circuit in a subset of the plurality of data channels, and a reused driver circuit is configured to provide one keep voltage for each of the plurality of pixel circuits.

5. The display driver circuit according to claim 1, wherein the plurality of pixel circuits comprise 1280 pixel circuits or 2560 pixel circuits.

6. The display driver circuit according to claim 1, wherein the OLED screen is a low-temperature polycrystalline oxide (LTPO) display.

7. A method for a display driver circuit, wherein the display driver circuit is configured to drive an organic light-emitting display (OLED) screen, provide a data signal in a data refresh frame, and provide a keep voltage in a plurality of keep frames, wherein the display driver circuit comprises a plurality of data channels, a voltage keep channel, and a plurality of screen drive switches, wherein the OLED screen is configured to operate in a plurality of screen refreshing frequency periods, each refresh frequency period comprises the data refresh frame and the plurality of keep frames, the plurality of keep frames are configured after the data refresh frame, wherein the OLED screen comprises a plurality of pixel circuits each comprising a data thin film transistor, and the plurality of screen drive switches are disposed in a one-to-one correspondence with the plurality of pixel circuits; and the method comprises:

providing, by the plurality of data channels, data signals for the plurality of pixel circuits in a one-to-one correspondence manner;

providing, by the voltage keep channel, keep voltages for the plurality of pixel circuits; and selecting and providing, by each of the plurality of screen drive switches, a data signal and the keep voltage for a corresponding pixel circuit, wherein the keep voltage is configured to excite a carrier in each data thin film transistor to restore a respective drive current for driving the corresponding pixel circuit.

8. The method according to claim 7, wherein:

the voltage keep channel comprises a low dropout regulator (LDO), and the providing, by the voltage keep channel, keep voltages for the plurality of pixel circuits comprises:

providing, by the LDO, one keep voltage for each of the plurality of pixel circuits.

9. The method according to claim 7, wherein:

the voltage keep channel comprises a dedicated driver circuit, and the providing, by the voltage keep channel, keep voltages for the plurality of pixel circuits comprises:

providing, by the dedicated driver circuit, one keep voltage for each of the plurality of pixel circuits.

10. The method according to claim 7, wherein:

each of the plurality of data channels comprises one driver circuit, the voltage keep channel is configured to reuse a driver circuit in a subset of the plurality of data channels, and the providing, by the voltage keep channel, keep voltages for the plurality of pixel circuits comprises:

providing, by a reused driver circuit, one keep voltage for each of the plurality of pixel circuits.

11. The method according to claim 7, wherein the plurality of pixel circuits comprise 1280 pixel circuits or 2560 pixel circuits.

12. The method according to claim 7, wherein the OLED screen is a low-temperature polycrystalline oxide (LTPO) display.

* * * * *